US012227039B2

(12) United States Patent
Whinnery

(10) Patent No.: US 12,227,039 B2
(45) Date of Patent: Feb. 18, 2025

(54) SYSTEM AND METHOD FOR MONITORING VEHICLE TIRES

(71) Applicant: FORD GLOBAL TECHNOLOGIES, LLC, Dearborn, MI (US)

(72) Inventor: Joseph Whinnery, Soquel, CA (US)

(73) Assignee: Ford Global Technologies, LLC, Dearborn, MI (US)

(*) Notice: Subject to any disclaimer, the term of this patent is extended or adjusted under 35 U.S.C. 154(b) by 388 days.

(21) Appl. No.: 17/878,561

(22) Filed: Aug. 1, 2022

(65) Prior Publication Data
US 2024/0034109 A1 Feb. 1, 2024

(51) Int. Cl.
*B60C 23/06* (2006.01)
*B60C 23/04* (2006.01)

(52) U.S. Cl.
CPC ........ *B60C 23/064* (2013.01); *B60C 23/0401* (2013.01)

(58) Field of Classification Search
CPC . B60C 23/064; B60C 23/0401; B60C 11/246; B60C 23/068; B60C 23/00; B60W 2050/021; B60W 2050/143; B60W 2420/403; B60W 2420/408; B60W 2756/10; B60W 60/0016; B60R 11/00; B60R 11/04; B60R 2011/004
USPC .................................................. 340/442, 443
See application file for complete search history.

(56) References Cited

U.S. PATENT DOCUMENTS

| | | | |
|---|---|---|---|
| 10,399,393 B1* | 9/2019 | Trotta | B60C 23/0452 |
| 11,328,403 B2* | 5/2022 | Levin | H04N 13/243 |
| 2008/0238644 A1 | 10/2008 | Voigtlaender et al. | |
| 2018/0134529 A1 | 5/2018 | Zecher et al. | |
| 2021/0181737 A1 | 6/2021 | Patnaik et al. | |

* cited by examiner

*Primary Examiner* — Eric Blount
(74) *Attorney, Agent, or Firm* — Frank A. MacKenzie; Brooks Kushman P.C.

(57) ABSTRACT

Disclosed herein are system and method embodiments for monitoring tire conditions. For example, the system includes a sensor that is configured to: receive light that is reflected off of at least one object within a field of view (FOV) that is adjacent to a vehicle as reflected light, and provide tire data indicative of a distance between the sensor and a surface of a tire of the vehicle extending into the FOV based on the reflected light. A controller is configured to generate a message in response to a moment of a probability distribution of the tire data being less than a threshold, or tire data indicative of a rate of change of shadow length exceeding a threshold shadow length, and to provide the message to at least one of a user interface, a vehicle system, and an external computing device.

20 Claims, 9 Drawing Sheets

SYSTEM AND METHOD FOR MONITORING VEHICLE TIRES

TECHNICAL FIELD

One or more embodiments relate to a sensor system for monitoring vehicle tire conditions.

BACKGROUND

A vehicle may include a sensor system to monitor its external environment for obstacle detection and avoidance. The sensor system may include multiple sensor assemblies for monitoring obstacles proximate to the vehicle in the near-field and distant objects in the far-field. Each sensor assembly may include one or more sensors, such as a camera, a radio detection and ranging (radar) sensor, and a light detection and ranging (lidar) sensor. A lidar sensor includes one or more emitters for transmitting light pulses away from the vehicle, and one or more detectors for receiving and analyzing reflected light pulses. The sensor system may determine the location of objects in the external environment based on data from the sensors. The vehicle may control one or more vehicle systems, e.g., a powertrain, braking systems, and steering systems based on the locations of the objects.

SUMMARY

In one embodiment, an autonomous vehicle (AV) system is provided with a sensor that is configured to: receive light that is reflected off of at least one object within a field of view (FOV) that is adjacent to a vehicle as reflected light, and provide tire data indicative of a distance between the sensor and a surface of a tire of the vehicle extending into the FOV based on the reflected light. A controller is configured to generate a message in response to a moment of a probability distribution of the tire data being less than a threshold, or tire data indicative of a rate of change of shadow length exceeding a threshold shadow length, and to provide the message to at least one of a user interface, a vehicle system, and an external computing device.

In yet another embodiment, a method is provided for monitoring tire conditions. Light reflected off of at least one object within a field of view (FOV) adjacent to a vehicle is received by a sensor as reflected light. Tire data indicative of a distance between the sensor and a surface of a tire of the vehicle extending into the FOV. A first tire message is generated in response to a moment of a probability distribution of the tire data being less than a threshold. A second tire message is generated in response to tire data indicative of a rate of change of shadow length exceeding a threshold shadow length. The first tire message or the second tire message is provided to at least one of a user interface, a vehicle system, and an external computing device.

A non-transitory computer-readable medium having instructions stored thereon is provided. The instructions, when executed by at least one computing device, cause the at least one computing device to perform operations comprising: providing tire data indicative of a distance between a sensor and a surface of a tire of a vehicle extending into a field of view (FOV) adjacent to the vehicle; generating a message in response to a moment of a probability distribution of the tire data being less than a threshold, or a difference between a first shadow length and a second shadow length of the tire data exceeding a threshold shadow length; and providing the message to at least one of a user interface, a vehicle system, and an external computing device.

DETAILED DESCRIPTION

Figure 1:
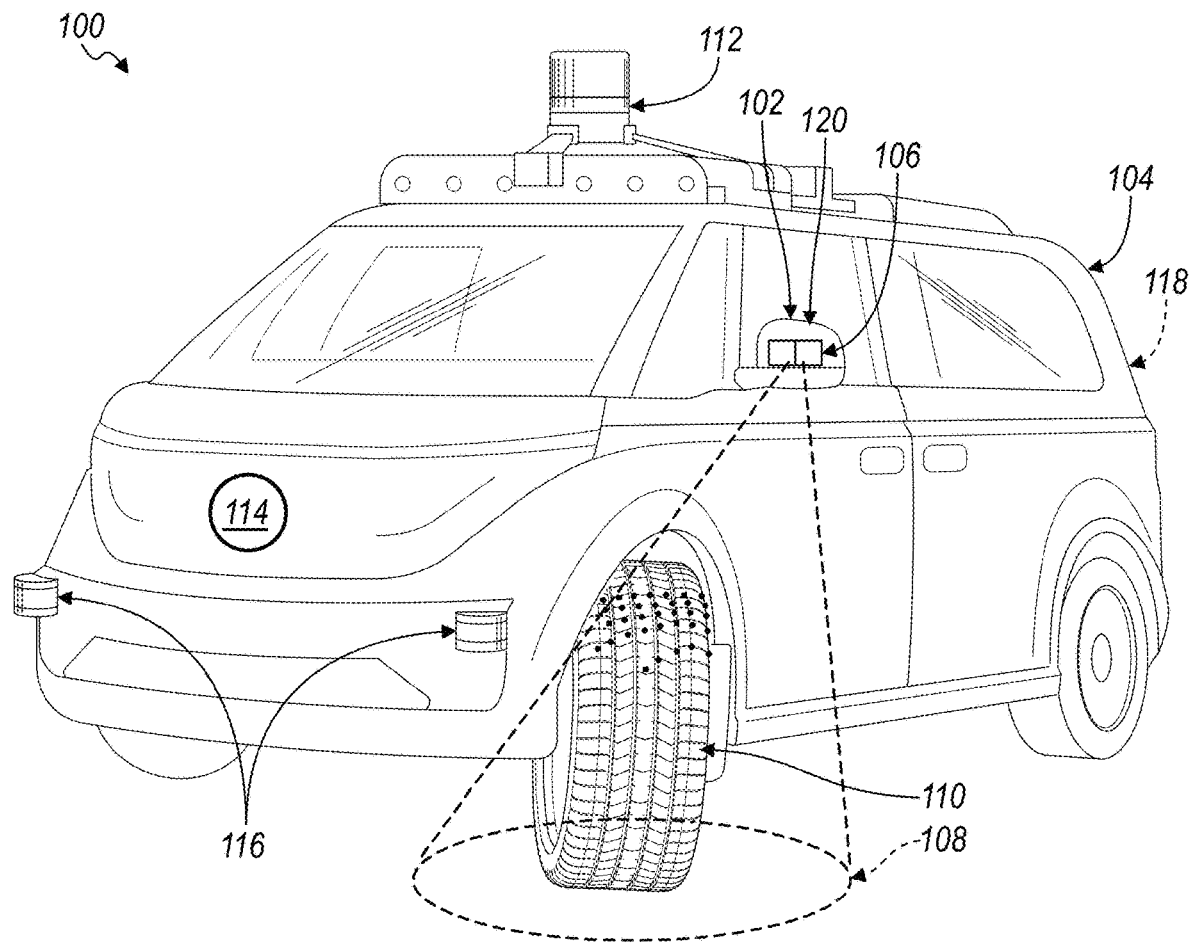
FIG. 1 is a front-perspective view of an exemplary autonomous vehicle (AV) with an AV system for monitoring tire conditions, in accordance with aspects of the disclosure.

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicles include external components that wear over time, e.g., tires. Many vehicle manufacturers recommend that drivers inspect vehicle tires for signs of wear or damage, and confirm tire pressure as part of a pre-trip vehicle inspection. For autonomous vehicles (AVs), a driver is not always present to perform such inspection. Tire wear is dependent on many factors including: driving surface, driving speeds, dynamic driving conditions, amount of low-speed steering adjustments, etc. For a fleet of autonomous vehicles, tire tread and pressure may be inspected as part of regular AV "pre-drive" fleet operations. These inspections may be manually intensive and require a significant amount of data entry, which may be prone to human error. Furthermore, as tires wear and tire tread depth decreases, vehicle traction decreases. Accordingly, the proposed systems and methods of the present disclosure provide solutions to monitor vehicle tire conditions, using one or more sensors of the sensor system.

AVs are equipped with a vast array of advanced sensors which are designed to detect physical characteristics of the environment surrounding the AV. The present disclosure proposes using some of the advanced sensors, e.g., the lidar and camera sensors positioned near the front tires to monitor tire conditions, such as tread wear, alignment, and inflation, when the front tires are rotated into the field of view (FOV) of the sensors.

By observing the raw sensor data when a portion of the tire tread is within the sensor FOV, a correlation between the sensor data and tire tread depth can be determined. The tire tread depth may be used as one indicator of tire wear. In this way, an AV system monitors the tires directly, and may provide alerts to fleet operators when the sensor data indicates that the tires or associated steering systems need servicing.

In accordance with aspects of the disclosure, a lidar sensor for monitoring proximate objects, i.e., a near-field lidar sensor, is mounted aft and above each front tire such that when the front tires are rotated to a large steering angle, a portion of the tire tread is within the corresponding lidar sensor FOV. The AV system uses lidar returns, i.e., light pulses that reflect from the tire as it is rotated into the FOV, as well as returns while the tire is stationary in the FOV, to determine the tire conditions.

A sensor that is sensitive and accurate enough to measure the tire tread depth directly with high enough resolution and accuracy may be cost prohibitive, or not ideally suited for the primary objective of an AV sensor for monitoring the external driving environment during driving.

The present disclosure utilizes the existing lidar sensor of the AV system with a statistical analysis of the lidar data returns to determine the variation in tire tread depth. For 5-10 lidar sweeps per second, when sampling over several seconds, a random spatial sampling of the tire can be achieved. There will be lidar returns from down in the tread, as well as from the outer edge of the tire tread. The present disclosure also uses a probability distribution of measurements that varies with tire wear, e.g., for tires with deep tread depth, the standard deviation of measurements will be greater than for tires where there is very little height difference between the bottom of the tread pattern and the remaining exposed tire tread.

The AV system uses statistical methods that analyze the probability distribution of the average distance for the tire surface in the FOV as a correlation to the tread depth. For example, the AV system may analyze the first, second, third, and/or fourth moment of the probability distribution, which correspond to the standard deviation, the variation, the skew, and the kurtosis, respectively. Specifically, when tire tread is deep, i.e., the tire is new and not worn, the statistical variation from a series of sequential lidar sweeps will be greater for deeper tire tread depths than when the tire is worn. In this way, it is not necessary to measure the tread depth directly. Rather, with repeated lidar sweep samples of the tire tread, the variation of measured distances for lidar returns can be used as a proxy for the tread depth. When tires have a deep tread depth, i.e., new tires, the standard deviation will be greater. When the tire tread depth is shallow, i.e., worn tires, the standard deviation will be much less.

In yet another aspect of the disclosure, tires can be monitored for uneven tread wear, which may be a sign of incorrect tire inflation or incorrect steering alignment (e.g., toe, camber, etc.). By segmenting the lidar returns into different portions of the tire, lidar measurements can be used to determine if a tire is wearing on the outer edge, in the middle tread pattern, or on the inside edge of the tire. Said another way, aspects of the present disclosure include a system configured to detect tread depth differences across various regions of a single tire.

In accordance with aspects of the disclosure, the AV system may control a camera sensor in conjunction with an external illumination source, to observe the shadow patterns of the grooves in tire tread patterns. A new tire with deep tread depth, will cast a larger shadow from the same illumination source compared to a tire with a shallow tread depth.

Many tires also are equipped with wear bar indicators that are spaced between the treads. By observing when a wear bar is even with the tread, it is possible to determine the amount of remaining tire tread depth. Using a camera to visually inspect a tire in conjunction with an external light source, the tire tread depth can be inferred by either the presence or the absence of the shadows cast by the wear bar indicators. There are several variations that are more fully described in more detail below.

With reference to FIG. 1, a sensor system for monitoring tire conditions is illustrated in accordance with aspects of the disclosure and generally referenced by numeral 100. The sensor system 100 includes multiple sensor assemblies, including a side sensor assembly 102, that are mounted to an autonomous vehicle (AV) 104. The side sensor assembly 102 includes one or more sensors 106 to monitor a field-of-view (FOV) 108, represented by dashed lines in FIG. 1, proximate to the AV 104. The sensor 106 monitors tire conditions, e.g., wear, alignment, and inflation, during turning maneuvers when a tire 110 is within the FOV 108.

The sensor system 100 includes multiple sensor assemblies to monitor a 360-degree FOV around the AV 104, both in the near-field and the far-field. The sensor system 100 includes the side sensor assembly 102, a top sensor assembly 112, a front central sensor assembly 114, two front side sensor assemblies 116, and one or more rear sensor assemblies 118, according to aspects of the disclosure. Each sensor assembly includes one or more sensors, e.g., a camera, a lidar sensor, and a radar sensor.

The side sensor assembly 102 may be mounted to a side of the AV 104. In the example of FIG. 1, the side sensor assembly 102 is mounted to a side mirror assembly 120. The side sensor assembly 102 includes one or more sensors 106, e.g., a lidar sensor and a camera, that is oriented downward toward the ground to monitor the FOV 108, according to aspects of the disclosure. The sensor 106 also monitors tire conditions when the tire 110 is turned into the FOV 108. The sensor system 100 also includes a second side sensor assembly (not shown) that is mounted to an opposite side of the AV 104 for monitoring the opposing front tire.

The top sensor assembly 112 is mounted to a roof of the AV 104 and includes a lidar sensor and one or more cameras. The lidar sensor rotates about a vertical axis to scan a 360-degree FOV about the AV 104 in a far-field. The front central sensor assembly 114 is mounted to the front of the AV 104, e.g., to the hood or bumper, and includes at least a radar sensor for monitoring a front FOV for large objects, e.g., vehicles, in front of the AV 104. The front central sensor assembly 114 may also include one or more cameras. The front side sensor assemblies 116 and the rear sensor assemblies 118 each include a camera and/or a lidar sensor for monitoring the FOVs in front of and behind the AV 104.

Figure 2:
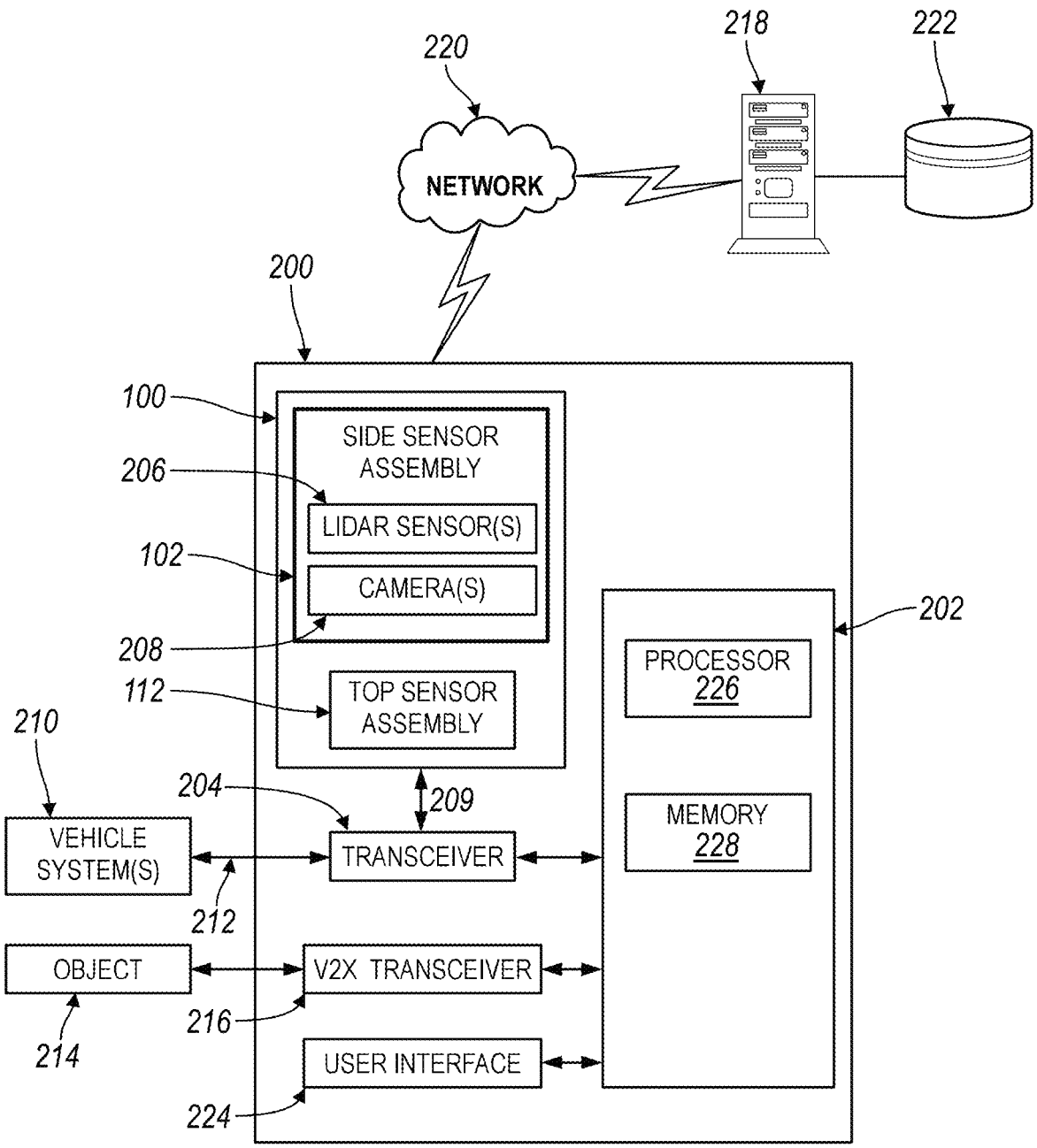
FIG. 2 is a schematic diagram illustrating communication between the AV system and other systems and devices.

FIG. 2 illustrates communication between an AV system 200 and other systems and devices according to aspects of the disclosure. The sensor system 100 is included in the AV system 200, and communicates with a controller 202 through a transceiver 204. The sensor system 100 includes multiple sensor assemblies, e.g., the side sensor assembly 102 and the top sensor assembly 112. Each sensor assembly 102, 112 includes one or more sensors, e.g., a lidar sensor 206, a camera 208, and a radar sensor (not shown). The camera 208 may be a visible spectrum camera, an infrared camera, etc., according to aspects of the disclosure, to capture images of the tire 110. The sensor system 100 may include additional sensors, such as a sound navigation and ranging (SONAR) sensor, temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor system 100 provides sensor data 209 that is indicative of the external environment of the AV 104. The controller 202 analyzes the sensor data to identify and determine the location of external objects relative to the AV 104, e.g., the location of traffic lights, remote vehicles, pedestrians, etc.

The AV system 200 also communicates with one or more vehicle systems 210, e.g., an engine, a transmission, a navigation system, a brake system, etc. through the transceiver 204. The controller 202 may receive information from the vehicle systems 210 that is indicative of present operating conditions, e.g., vehicle speed, engine speed, turn signal status, brake position, vehicle position, steering angle, and tire identification. The controller 202 may also control one or more vehicle systems 210, e.g., a propulsion system, a braking system, and a steering system, based on the sensor data 209 from the sensor system 100. The controller 202 may communicate directly with the vehicle systems 210, or communicate indirectly with the vehicle systems 210 over a vehicle communication bus e.g., a CAN bus 212.

The AV system 200 may also communicate with external objects 214, e.g., remote vehicles and structures, to share the external environment information and/or to collect additional external environment information. The AV system 200 may include a vehicle-to-everything (V2X) transceiver 216 that is connected to the controller 202 for communicating with the objects 214. For example, the AV system 200 may use the V2X transceiver 216 for communicating directly with a remote vehicle vehicle-to-vehicle (V2V) communication, a structure (e.g., a sign, a building, or a traffic light) by vehicle-to-infrastructure (V2I) communication, and a motorcycle by vehicle-to-motorcycle (V2M) communication. Each V2X device may provide information indictive of its own status, or the status of another V2X device.

The AV system 200 may communicate with a remote computing device 218 over a communications network 220 using one or more of the transceivers 204, 216, e.g., to provide a message or visual that indicates the location of the objects 214 relative to the AV 104, and current tire conditions, based on the sensor data 209. The remote computing device 218 may include one or more servers to process one or more processes of the technology described herein. The remote computing device 218 may also communicate data with a database 222 over the network 220. AV fleet operators may monitor the status of an AV fleet using the remote computing device 218 to receive alerts that indicate that the tires or associated steering systems of the AV 104 need servicing.

The AV system 200 also includes a user interface 224 to provide information to a user of the AV 104. The controller 202 may control the user interface 224 to provide a message or visual that indicates the location of the objects 214 relative to the AV 104, and current tire conditions, based on the sensor data 209.

Although the controller 202 is described as a single controller, it may contain multiple controllers, or may be embodied as software code within one or more other controllers. The controller 202 includes a processing unit, or processor 226, that may include any number of microprocessors, ASICs, ICs, memory (e.g., FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. The controller 202 also includes memory 228, or non-transitory computer-readable storage medium, that is capable of executing instructions of a software program. The memory 228 may be, but is not limited to, an electronic storage device, a magnetic storage device, an optical storage device, an electromagnetic storage device, a semi-conductor storage device, or any suitable combination thereof. In general, the processor 226 receives instructions, for example from the memory 228, a computer-readable medium, or the like, and executes the instructions. The controller 202, also includes predetermined data, or "look up tables" that are stored within memory, according to aspects of the disclosure.

Figure 3:
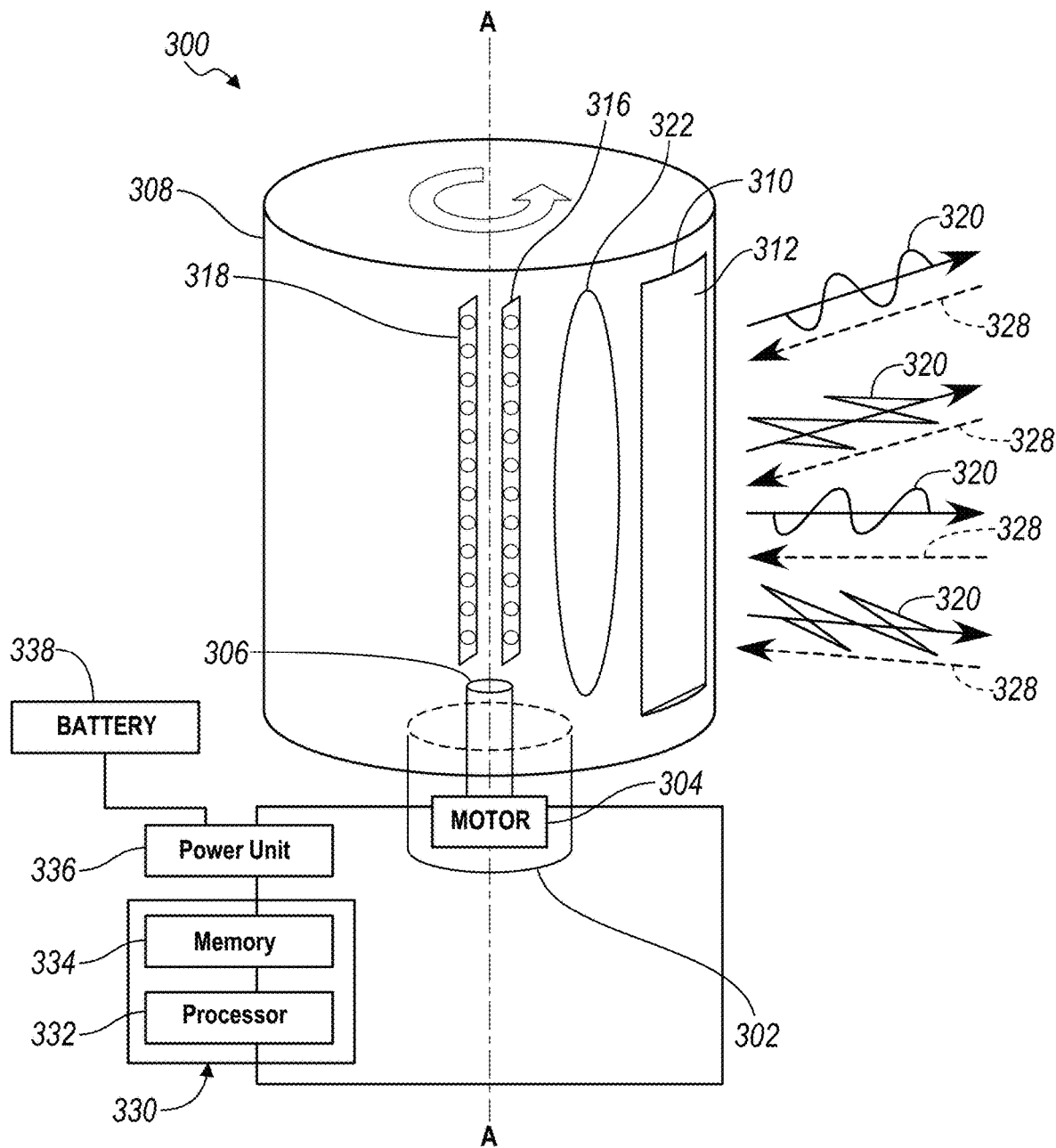
FIG. 3 is an exemplary architecture of a lidar sensor of the AV system, in accordance with aspects of the disclosure.

FIG. 3 illustrates an exemplary architecture of a lidar sensor 300, such as the lidar sensor 206 of the side sensor assembly 102, according to aspects of the disclosure. The lidar sensor 300 includes a base 302 that is mounted to the AV 104, e.g., to the side mirror assembly 120. The base 302 includes a motor 304 with a shaft 306 that extends along a longitudinal axis A-A. The lidar sensor 300 also includes a housing 308 that is secured to the shaft 306 and mounted for rotation relative to the base 302 about Axis A-A. The housing 308 includes an opening 310 and a cover 312 that is secured within the opening 310. The cover 312 is formed of a material that is transparent to light, e.g., glass. Although a single cover 312 is shown in FIG. 3, the lidar sensor 300 may include multiple cover s 312.

The lidar sensor 300 includes one or more emitters 316 for transmitting light pulses 320 through the cover 312 and away from the AV 104. The light pulses 320 are incident on one or more objects, e.g., the tire 110, and reflect back toward the lidar sensor 300 as reflected light pulses 328. The lidar sensor 300 also includes one or more light detectors 318 for receiving the reflected light pulses 328 that pass through the cover 312. The detectors 318 also receive light from external light sources, e.g., the sun. The lidar sensor 300 rotates about Axis A-A to scan the region within the FOV 108. The lidar sensor 300 may rotate 360 degrees about the axis, and ignore data reflected off of the AV 104. The emitters 316 and the detectors 318 may be stationary, e.g., mounted to the base 302, or dynamic and mounted to the housing 308.

The emitters 316 may include laser emitter chips or other light emitting devices and may include any number of individual emitters (e.g., 8 emitters, 64 emitters, or 128 emitters). The emitters 316 may transmit light pulses 320 of substantially the same intensity or of varying intensities, and in various waveforms, e.g., sinusoidal, square-wave, and sawtooth. The lidar sensor 300 may include one or more optical elements 322 to focus and direct light that is passed through the cover 312.

The detectors 318 may include a photodetector, or an array of photodetectors, that is positioned to receive the reflected light pulses 328. According to aspects of the disclosure, the detectors 318 include a plurality of pixels, wherein each pixel includes a Geiger-mode avalanche photodiode, for detecting reflections of the light pulses during each of a plurality of detection frames. In other embodiments, the detectors 318 include passive imagers.

The lidar sensor 300 includes a controller 330 with a processor 332 and memory 334 to control various components, e.g., the motor 304, the emitters 316, and the detectors 318. The controller 330 also analyzes the data collected by the detectors 318, to measure characteristics of the light received, and generates information about the environment external to the AV 104. The controller 330 may be integrated with another controller, e.g., the controller 202 of the AV system 200. The lidar sensor 300 also includes a power unit 336 that receives electrical power from a vehicle battery 338, and supplies the electrical power to the motor 304, the emitters 316, the detectors 318, and the controller 330.

Figure 4:
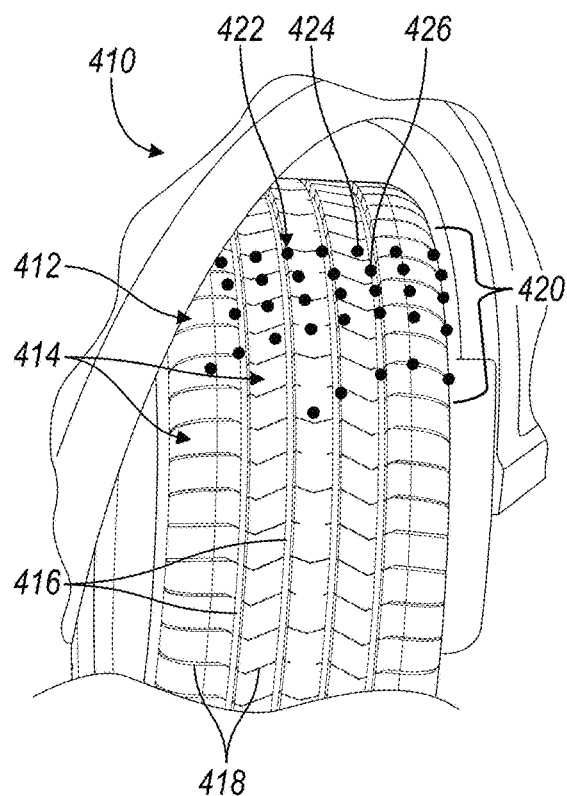
FIG. 4 is an enlarged view of a new tire, illustrating a sweep by a lidar sensor, in accordance with aspects of the disclosure.

Referring collectively to FIGS. 3-4, the emitters 316 of the lidar sensor 300 emit light pulses 320 that are incident on a tire 410 and reflect back as reflected light pulses 328. The detectors 318 receive the reflected light pulses 328 and provide corresponding sensor data to the controller 330. The controller 330 may determine a distance between the lidar sensor 300 and the tire 410 based on the sensor data.

The tire 410 includes tread 412 that is separated into segments 414 by longitudinal grooves 416 and lateral grooves 418. As the lidar sensor 206 rotates, the light pulses 320 scan laterally across the tire 410 to form scanlines or scan patterns 420, e.g., one of the emitters 316 generates a first scan pattern 422. The controller 330 may determine a height of the tread 412 along one of the scan patterns 420 based on changes in the distance measurements along one of the scan patterns 420, e.g., the difference between the distance to the tread 412 at a first segment 424 as compared to the distance to the longitudinal groove 416 at point 426.

Figure 5:
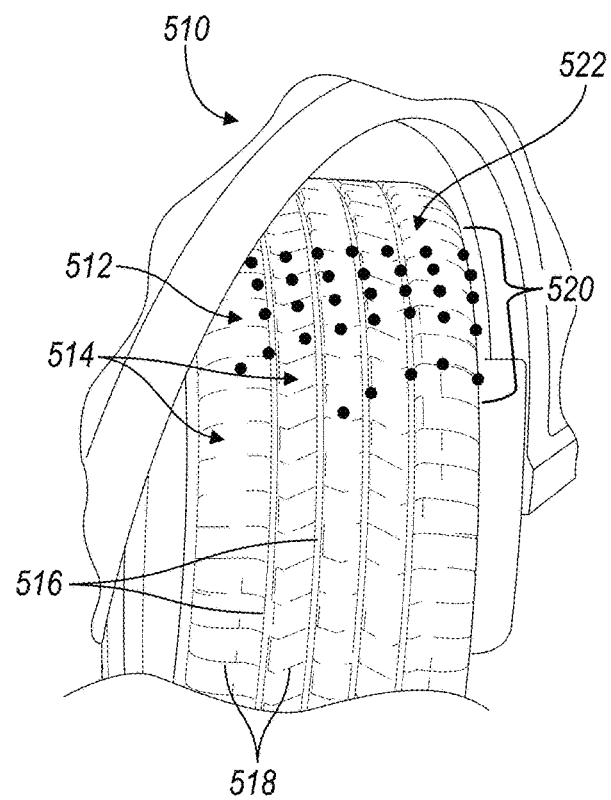
FIG. 5 is an enlarged view of a worn tire, illustrating another sweep by a lidar sensor, in accordance with aspects of the disclosure.

FIG. 4 illustrates a new tire 410 and FIG. 5 illustrates a worn tire 510, which may be representative of the new tire 410 after it has been driven for an extended distance, e.g., more than 60,000 miles. Like the new tire 410, the worn tire 510 includes tread 512 that is separated into segments 514 by longitudinal grooves 516 and lateral grooves 518. As the lidar sensor 300 rotates, the light pulses 320 scan laterally across the tire to form scan patterns 520. The controller 330 may determine the tread height for the worn tire 510 based on changes in the distance measurements along one of the scan patterns 520, e.g., the difference between the distance to the tread 512 and the distance to the longitudinal grooves 516 or the lateral grooves 518. The height of the tread 412 of the new tire 410 is greater than the height of the tread 512 of the worn tire 510, therefore the distance measurement to the new tread 412 is less than the distance measurement to the worn tread 512.

Figure 6:
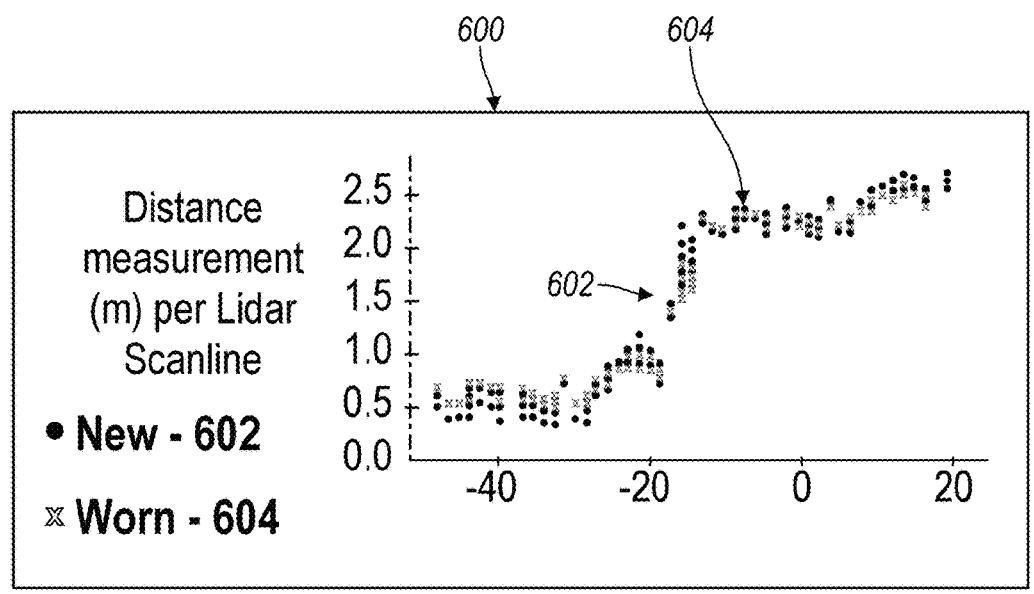
FIG. 6 is a graph illustrating a comparison of lidar sensor data of different tires, in accordance with aspects of the disclosure.

FIG. 6 is a graph 600 illustrating a comparison of distance measurements based on lidar sensor data of the new tire 410 to the worn tire 510. The graph 600 includes a first curve 602 that represents the distance measurement to the tread 412, in meters (m), of the new tire 410 along the first scan pattern 422, and a second curve 604 that represents the distance measurement (m) to the tread 512 along the first scan pattern 522. While meters are provided as an example distance increment, it should be appreciated that other distance increments may be suitable according to aspects of the present disclosure. The horizontal axis of the graph 600 represents a lateral distance across each tire 410, 510. For example, with reference to FIG. 8, zero (0) represents a central location 832. Similarly, 20 mm and −20 mm represent midpoints 838 and 840. Along the same convention, −40 mm represents the inner edge 836.

Referring back to FIG. 6, the curves 602, 604 overlap due to the sensitivity of the lidar sensor 300, which makes it difficult to detect tire wear using a direct measurement approach. This is because the lidar sensors 300 are configured to monitor the external driving environment for large objects, e.g., vehicles or pedestrians, that are greater distances from the AV 104 as opposed to monitoring wear in small increments, e.g., in millimeters (mm).

Figure 7:
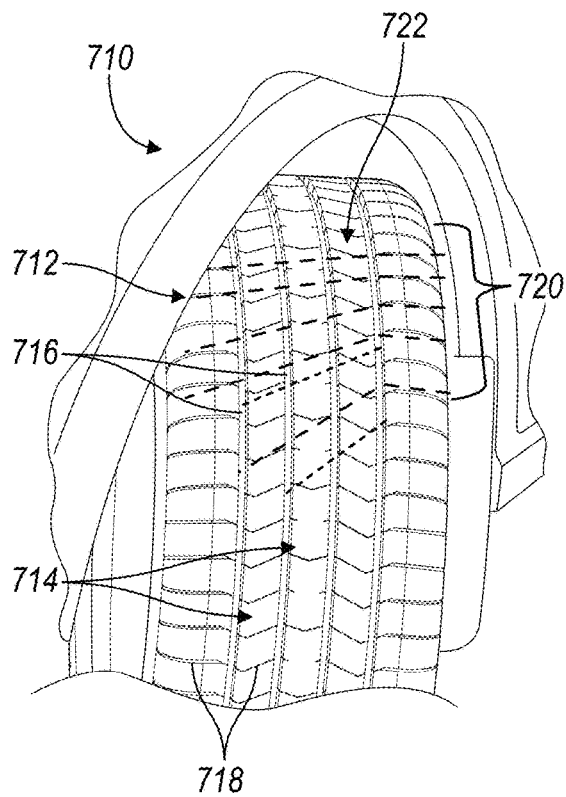
FIG. 7 is another enlarged view of the new tire, illustrating multiple sweeps by a lidar sensor, in accordance with aspects of the disclosure.
Figure 8:
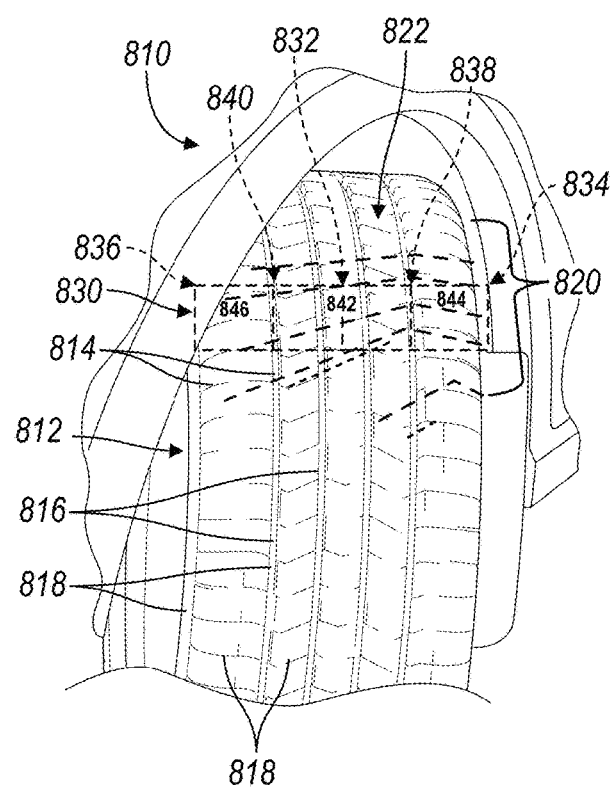
FIG. 8 is another enlarged view of the worn tire, illustrating multiple sweeps by a lidar sensor, in accordance with aspects of the disclosure.
Figure 9:
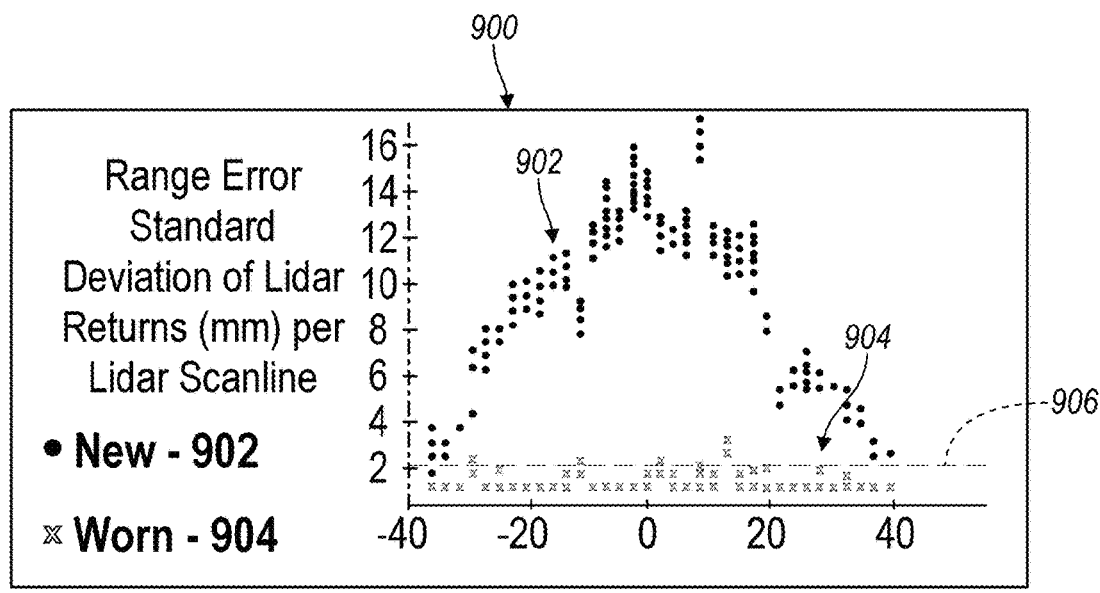
FIG. 9 is a graph illustrating a comparison of statistical models of lidar sensor data for different tires, in accordance with aspects of the disclosure.

FIGS. 7-9 illustrate a statistical analysis of the measured distance to a tire. FIG. 7 illustrates a new tire 710 and FIG. 8 illustrates a worn tire 810, which may represent the new tire 710 after it has been driven a large distance, e.g., more than 60,000 miles. The new tire 710 includes tread 712 that is separated into segments 714 by longitudinal grooves 716 and lateral grooves 718. As the lidar sensor 300 rotates, the light pulses 320 scan laterally across the new tire 710 to form scan patterns 720. The controller 330 analyzes the scan patterns 720 from multiple sequential sweeps across the new tire 710, e.g., 10-100 sweeps, using statistical methods to analyze the probability distribution, e.g., the standard deviation, the variance, the skew, and/or the kurtosis of the average distance for the tire surface in the FOV as a correlation to the tread depth.

The worn tire 810 also includes tread 812 that is separated into segments 814 by longitudinal grooves 816 and lateral grooves 818. As the lidar sensor 300 rotates, the light pulses 320 scan laterally across the worn tire 810 to form scan patterns 820. The controller 330 analyzes the scan patterns 820 from multiple sequential sweeps across the worn tire 810, e.g., 10-100 sweeps, using statistical methods that analyze the probability distribution, e.g., the standard deviation, the variance, the skew, and/or the kurtosis of the average distance for the tire surface in the FOV as a correlation to the tread depth.

The worn tire 810 may be segmented into multiple regions across the lateral surface of the tire, as depicted a dashed box 830 in FIG. 8. The segments may be arranged relative to a central location 832, an outer edge 834, an inner edge 836, and midpoints 838, 840 between the central location 832 and the edges 834, 836, respectively. The regions include a central region 842 between the midpoints 838 and 840, an outer region 844 between the outer edge 834 and midpoint 838, and an inner region 846 between the inner edge 836 and midpoint 840. By segmenting the tire 810 into multiple regions, the controller 330 may analyze the sensor data to determine multiple tire conditions, e.g., wear, alignment, and inflation.

FIG. 9 is a graph 900 illustrating a statistical model of the standard deviation of distance measurements over multiple sequential scans of the new tire 710 and the worn tire 810. The horizontal axis of the graph 900 represents a lateral distance across each of the new tire 710 and the worn tire 810. The graph 900 includes a first curve 902 that represents the range error standard deviation of lidar returns per scan of the new tire 710 along a first scan pattern 722, and a second curve 904 that represents the range error standard deviation of lidar returns per scan of the worn tire 810 along a first scan pattern 822. Relative to the direct measurements reflected above in reference to graph 600, the curves 902, 904 do not significantly overlap in the graph 900, which makes it easier to distinguish the worn tire 810 from the new tire 710.

With reference to FIGS. 6 and 9, measuring tire conditions, e.g., tread wear, directly using lidar sensor distance data from an AV system 200 may be difficult, as shown by the overlapping curves 602, 604 in graph 600. This is because the lidar sensor is designed to monitor for large objects spaced at a distance apart from the AV, as opposed to detecting slight variation in tire tread depth. A lidar sensor that is sensitive and accurate enough to measure the tire tread depth directly with high enough resolution and accuracy may be cost prohibitive, and/or not ideally suited for the primary objective of an AV sensor for monitoring the external driving environment during driving. However, as shown in graph 900, the controller 330 may use statistical methods that analyze the probability distribution (e.g., the standard deviation of the average distance for the tire surface in the FOV) as a correlation to the tire tread depth.

Specifically, when tire tread is deep, such as the tread 712 of the new tire 710, the standard deviation from a series of sequential lidar scans (first curve 902), will be greater than the standard deviation from a series of sequential lidar scans of the worn tire 810, as represented by the second curve 904. In this way, it is not necessary to measure the tread depth directly. Rather, with repeated samples of the tire tread, the probability distribution (e.g., the standard deviation of measured distances for lidar returns) can be used as a proxy for the tread depth. When tires have a deep tread depth, e.g., the new tire 710, the standard deviation will be greater, as shown in curve 902. When the tire tread depth is lower, e.g., the worn tire 810, the standard deviation will be much less. Although FIG. 9 illustrates one moment of the probability distribution, i.e., the standard deviation, the AV system 200 may analyze other moments of the probability distribution of the average distance for the tire surface in the FOV as a correlation to the tread depth, according to aspects of the disclosure. For example, the AV system 200 may analyze the variance, the skew, and/or the kurtosis, because, like the standard deviation, these moments tend to smaller values as tread depth decreases due to tire wear.

Figure 10:
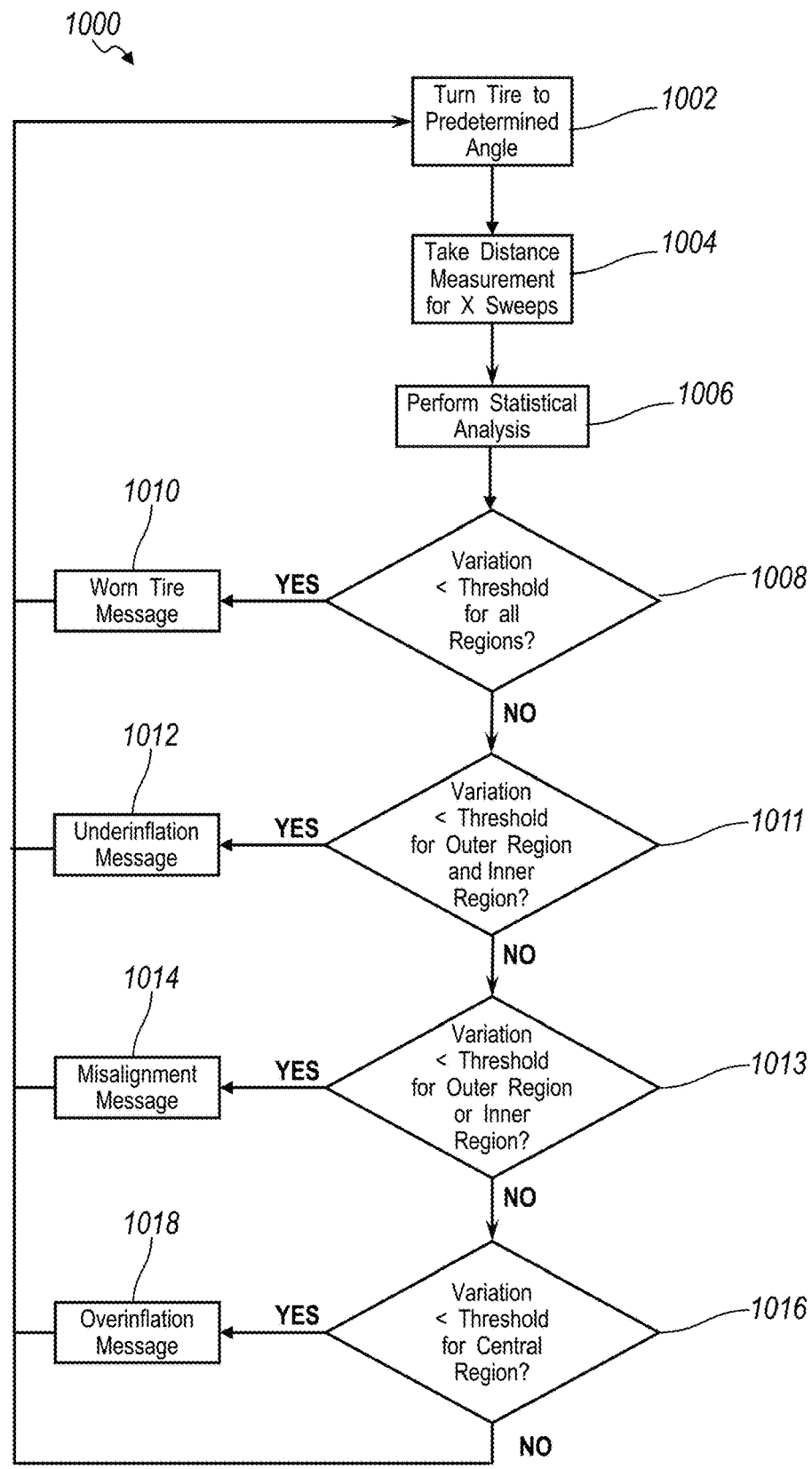
FIG. 10 is a flow chart illustrating a method for monitoring tire conditions based on lidar sensor data, in accordance with aspects of the disclosure.

With reference to FIG. 10, a flow chart depicting a method for monitoring tire conditions based on lidar sensor data is illustrated in accordance with one or more embodiments and is generally referenced by numeral 1000. The method 1000 is implemented using software code that is executed by the processor 332 and contained within the memory 334 (FIG. 3) according to aspects of the disclosure. While the flowchart is illustrated with a number of sequential steps, one or more steps may be omitted and/or executed in another manner without deviating from the scope and contemplation of the present disclosure.

At step 1002, the AV system 200 controls the position of the front tire to a predetermined steering angle, e.g., 40 degrees. The predetermined steering angle is great enough that the tire tread is within a FOV of at least one sensor. Then, at step 1004, the AV system 200 takes lidar distance measurements for a predetermined number of sweeps, e.g., 10-100 while the tire is positioned at the predetermined steering angle. In other embodiments, the AV system 200 monitors the steering angle during AV operation and takes the measurements of the tire tread after the steering angle is equal to a predetermined angle.

At step 1006, the AV system 200 performs a statistical analysis of the lidar sweeps to determine the probability distribution, e.g., the range error standard deviation or variation. At step 1008, the AV system 200 evaluates the variation to determine if the variation is less than a predetermined threshold variation. For example, the graph 900 of FIG. 9 illustrates a threshold variation of 2 mm, which is referenced by numeral 906. If the variation is less than the threshold variation for all regions of the tire, i.e., the central region 842, the outer region 844, and the inner region 846 of the worn tire 810 (FIG. 8), the AV system 200 proceeds to step 1010 and sends a signal indicative of a worn tire message. The AV system 200 may provide the worn tire message to a user interface 224 to display to a user, or to a vehicle system 210 or a remote computing device 218. The threshold may be different for different segments of the tire, e.g., 2 mm for a central region of the tire, and 4 mm for an outer region of the tire. If the AV system 200 determines that the variation is not less than the threshold for all regions, it proceeds to step 1011.

At step 1011, the AV system 200 determines if the variation is less than the threshold within the outer region 844 and the inner region 846 of the tire 810. If the variation is less than the threshold within both the outer region 844 and the inner region 846, the AV system 200 proceeds to step 1012 and issues a signal indicative of an underinflation message. If the AV system 200 determines that the variation is not less than the threshold for both the inner and outer region, it proceeds to step 1013.

At step 1013, the AV system 200 determines if the variation is less than the threshold within the outer region 844 or the inner region 846 of the tire 810. If the variation is less than the threshold within either the outer region 844 or the inner region 846, the AV system 200 proceeds to step 1014 and issues a signal indicative of a misalignment message. If the AV system 200 determines that the variation is not less than the threshold for the inner or outer region, it proceeds to step 1016.

At step 1016, the AV system 200 determines if the variation is less than the threshold within the central region 842 of the tire 810. If the variation is less than the threshold within the central region 842, the AV system 200 proceeds to step 1018 and issues a signal indicative of an overinflation message. If the AV system 200 determines that the variation is not less than the threshold for the central region, it returns to step 1002.

The controller 330 may save tire condition data for each tire and compare tire condition data over time. For example, the controller 330 may receive tire identification from a vehicle tire pressure monitoring system that allows the controller 330 to identify a tire, even if it is moved or rotated to another position on the vehicle.

Figure 11:
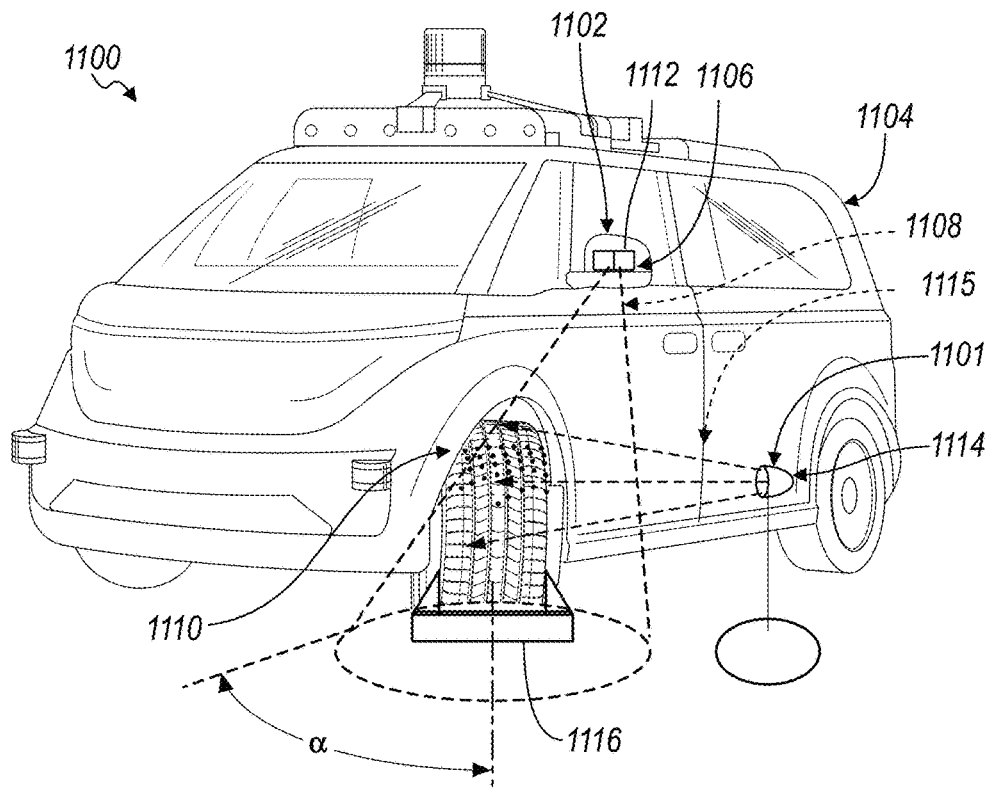
FIG. 11 is another schematic diagram of the AV, illustrating the sensor system and an external light source, in accordance with aspects of the disclosure.

With reference to FIG. 11, a sensor system for monitoring tire conditions is illustrated in accordance with aspects of the disclosure and generally referenced by numeral 1100. The sensor system 1100 coordinates with an external lighting system 1101 to monitor tire conditions. The sensor system 1100 includes multiple sensor assemblies, including a side sensor assembly 1102, that are mounted to an autonomous vehicle (AV) 1104. The side sensor assembly 1102 includes one or more sensors 1106 to monitor a field-of-view (FOV) 1108 that is proximate to the AV 1104. The sensor 1106 monitors tire conditions, e.g., wear, alignment, and inflation, during turning maneuvers when a tire 1110 enters the FOV 1108, e.g., such that 80% of the width of the tire is within the FOV. The one or more sensors 1106 include a camera 1112. The camera 1112 is a near field (NF) camera to capture images of the tire 1110. The camera 1112 is controlled to take a series of pictures at a frame rate of at least 10 frames per second, according to aspects of the disclosure.

The external lighting system 1101 includes a light source 1114 that is arranged to project light 1115 onto the tire 1110 to generate shadows that are used to monitor the tire conditions. The sensor system 1100 utilizes sensor data from one or more of the sensor assemblies to park the AV 1104 such that the tire 1110 is located at a predetermined position relative to the light source 1114. The external lighting system 1101 may also include a fixture 1116 that is sized to receive and locate the tire 1110 relative to the light source 1114. The external lighting system 1101 also includes a second light source (not shown) for monitoring the front—right tire (not shown).

Figures 12, 13, 14:
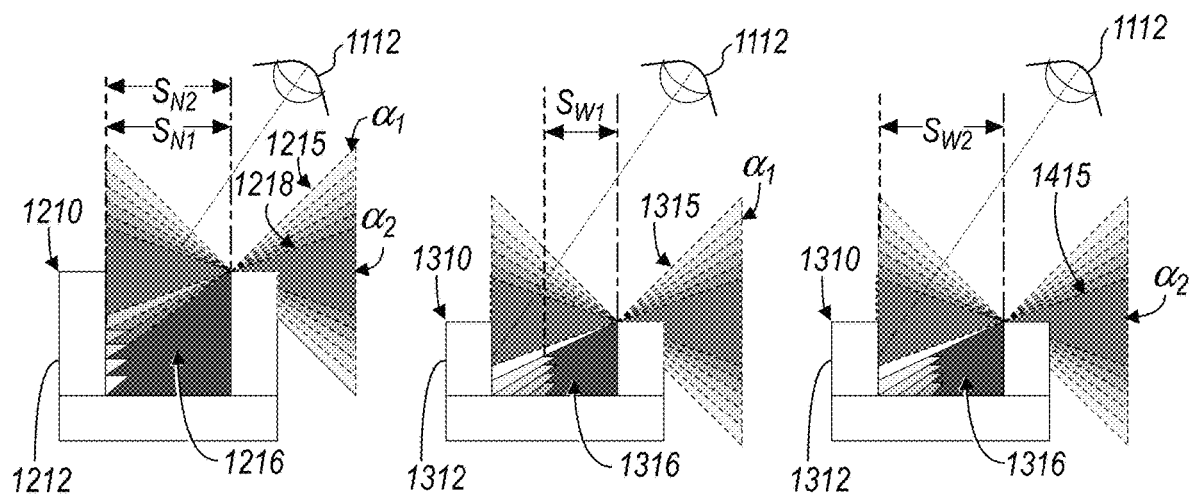
FIG. 12 is a partial sectional view of a new tire of the AV, illustrating shadows generated by the tread of a new tire, in accordance with aspects of the disclosure.
FIG. 13 is a partial sectional view of a worn tire of the AV, illustrating shadows generated by the tread of a worn tire in a first position, in accordance with aspects of the disclosure.
FIG. 14 is another partial sectional view of the worn tire of the AV of FIG. 13, illustrating shadows generated by the tread of the worn tire in a second position, in accordance with aspects of the disclosure.

With reference to FIGS. 12-14, the tire tread creates shadows that vary based on tire conditions. FIG. 12 illustrates a new tire 1210 with tread 1212 that is separated into segments by longitudinal grooves 1216. The tread 1212 blocks light 1215 from the light source 1114 (shown in FIG. 11) when it is arranged at a first steering angle ($\alpha_1$) to generate a shadow with a first shadow length ($S_{N1}$) that is monitored by the camera 1112. The tread 1212 also blocks light 1218 from the light source 1114 when it is arranged at a second steering angle ($\alpha_2$) to generate a shadow with a second shadow length ($S_{N2}$) that is monitored by the camera 1112. FIG. 13 illustrates a worn tire 1310 arranged at the first steering angle ($\alpha_1$), with tread 1312 that is separated into segments by longitudinal grooves 1316. The tread 1312 blocks light 1315 from the light source 1114 at the first steering angle ($\alpha_1$) to generate a shadow with a first shadow length ($S_{W1}$) that is monitored by the camera 1112. FIG. 14 illustrates the worn tire 1310 arranged at the second steering angle ($\alpha_2$), with tread 1312 that is separated into segments by longitudinal grooves 1316. The tread 1312 blocks light 1415 from the light source 1114 at the second steering angle ($\alpha_2$) to generate a shadow with a second shadow length ($S_{W2}$) that is monitored by the camera 1112.

The AV system 200 compares the shadow length to predetermined data that correlates shadow length with tire conditions, such as wear. The AV system 200 may also compare the shadow length against previous measurements to determine a change in tread depth indicative of wear. The tread 1212 may be separated into regions (as shown in FIG. 8) and the predetermined data may correlate certain tire conditions with shadow length at different regions. For example, low shadow length across the face of the tire 1210 may indicate wear, whereas low shadow length at one edge of the tire may indicate misalignment, and low shadow length at the center may indicate overinflation. As shown in FIGS. 12-14, the shadow length ($S_{N1}$, $S_{N2}$) of the new tire 1210 at both the first steering angle ($\alpha_1$) and the second steering angle ($\alpha_2$) is large due to the deep tread 1212. The shadow length ($S_{W1}$) of the worn tire 1310 at $\alpha_1$ is less than the shadow length ($S_{N1}$) of the new tire 1210 at $\alpha_1$ due to the shallow tread 1312. FIG. 14 further illustrates that the shadow length ($S_{W2}$) of the worn tire 1310 at the second steering angle ($\alpha_2$) is greater than the shadow length ($S_{W1}$) of the worn tire 1310 at the first steering angle ($\alpha_1$) due to the worn tire 1310 turning away from the light 1415.

Figure 15:
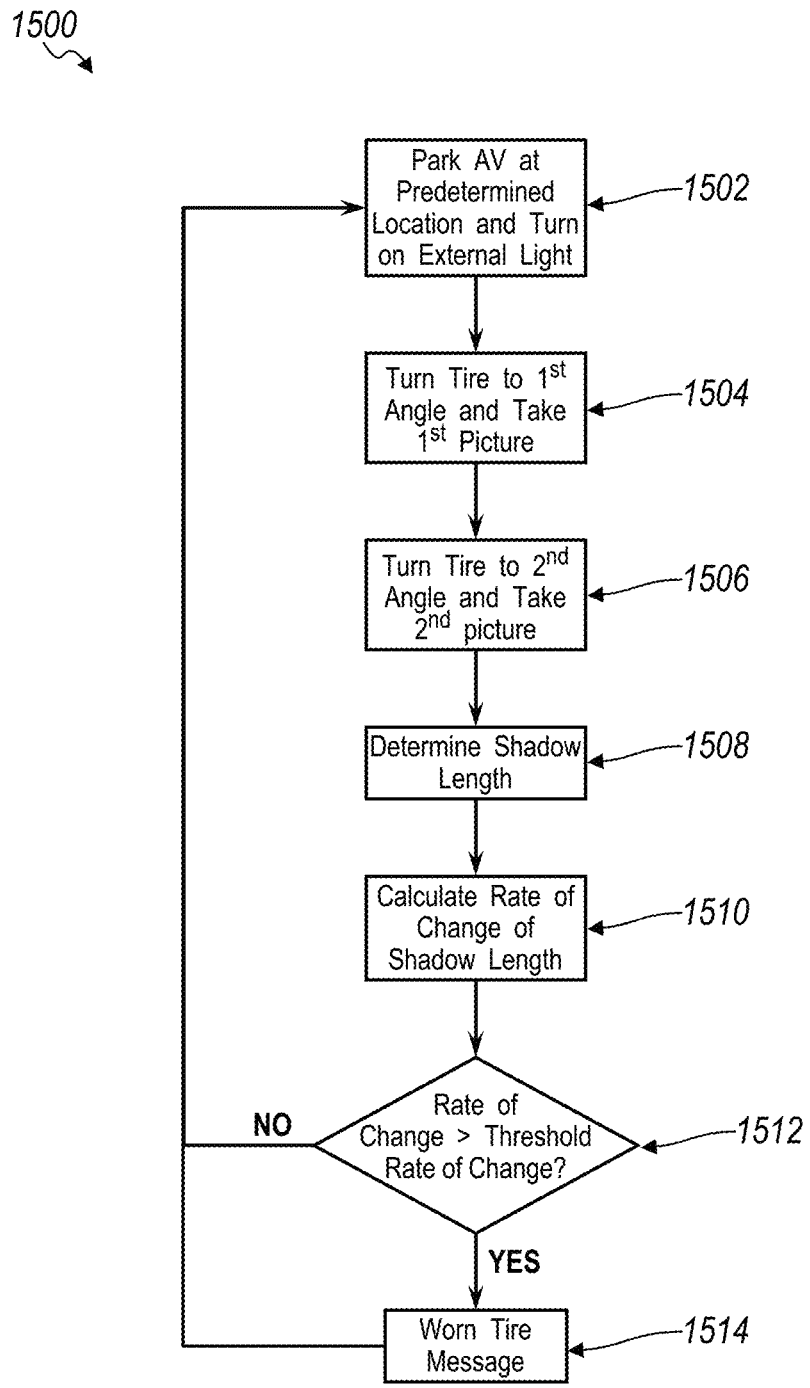
FIG. 15 is a flow chart illustrating a method for monitoring tire conditions based on camera data, in accordance with aspects of the disclosure.

With reference to FIG. 15 a flow chart depicting a method for monitoring tire conditions based on camera sensor data is illustrated in accordance with one or more embodiments and is generally referenced by numeral 1500. The method 1500 is implemented using software code that is executed by the processor 332 and contained within the memory 334 (FIG. 3) according to aspects of the disclosure. While the flowchart is illustrated with a number of sequential steps, one or more steps may be omitted and/or executed in another manner without deviating from the scope and contemplation of the present disclosure.

At step 1502, the AV system 200 controls the AV 104 to park at a predetermined location relative to the light source 1114. At step 1504, the AV system 200 turns the tire 1110 to a first steering angle, e.g., 5 degrees, and takes a first picture. At step 1506, the AV system 200 turns the tire 1110 to a second steering angle, e.g., 40 degrees, and takes a second picture. At step 1508, the AV system 200 determines a shadow length for each picture. Then at step 1510, the AV system 200 determines a rate of change of the shadow length. At step 1512, the AV system 200 compares the shadow length rate of change to a threshold rate of change corresponding to a predetermined rate of change of the steering angle. If the shadow length rate of change exceeds the threshold rate of change, the AV system 200 proceeds to step 1514 and issues a worn tire message.

According to aspects of the disclosure, the AV system 200 may control the camera 1112 to take a series of pictures as it controls the tire 1210 to rotate toward the light source 1114 between two steering angles at a constant rate over a period of time, to calculate the rate of change of shadow length based on many data points. For example, the camera 1112 may take pictures at a rate of 10 frames/second as the AV system 200 controls the tire 1210 to rotate through its maximum steering angle range, e.g., from 0 to 40 degrees at a constant rate over a three second period of time. The AV system 200 may filter the rate of change of the shadow length to remove any outliers.

The AV system 200 monitors both front tires, according to aspects of the disclosure. For example, the AV system 200 may rotate the front left tire from its maximum steering wheel angle to its minimum steering wheel angle (which corresponds to the maximum steering wheel angle for the front right tire) at a constant rate while taking pictures at a frame rate of 10 frames/second. Then the AV system 200 may analyze the images from both cameras to evaluate both tires.

A sensor that is sensitive and accurate enough to measure the tire tread depth directly with high enough resolution and accuracy may be cost prohibitive, or not ideally suited for the primary objective of an AV sensor for monitoring the external driving environment during driving. The AV system 100 utilizes existing sensors, e.g., the lidar sensor 206 and/or the camera 208, to monitor tire conditions. The AV system 100 uses the existing lidar sensor 206 with a statistical analysis of the lidar data returns to determine the variation in tire tread depth. The AV system 100 also uses the existing camera 208 in cooperation with an external lighting system 1101 to monitor tire wear.

Figure 16:
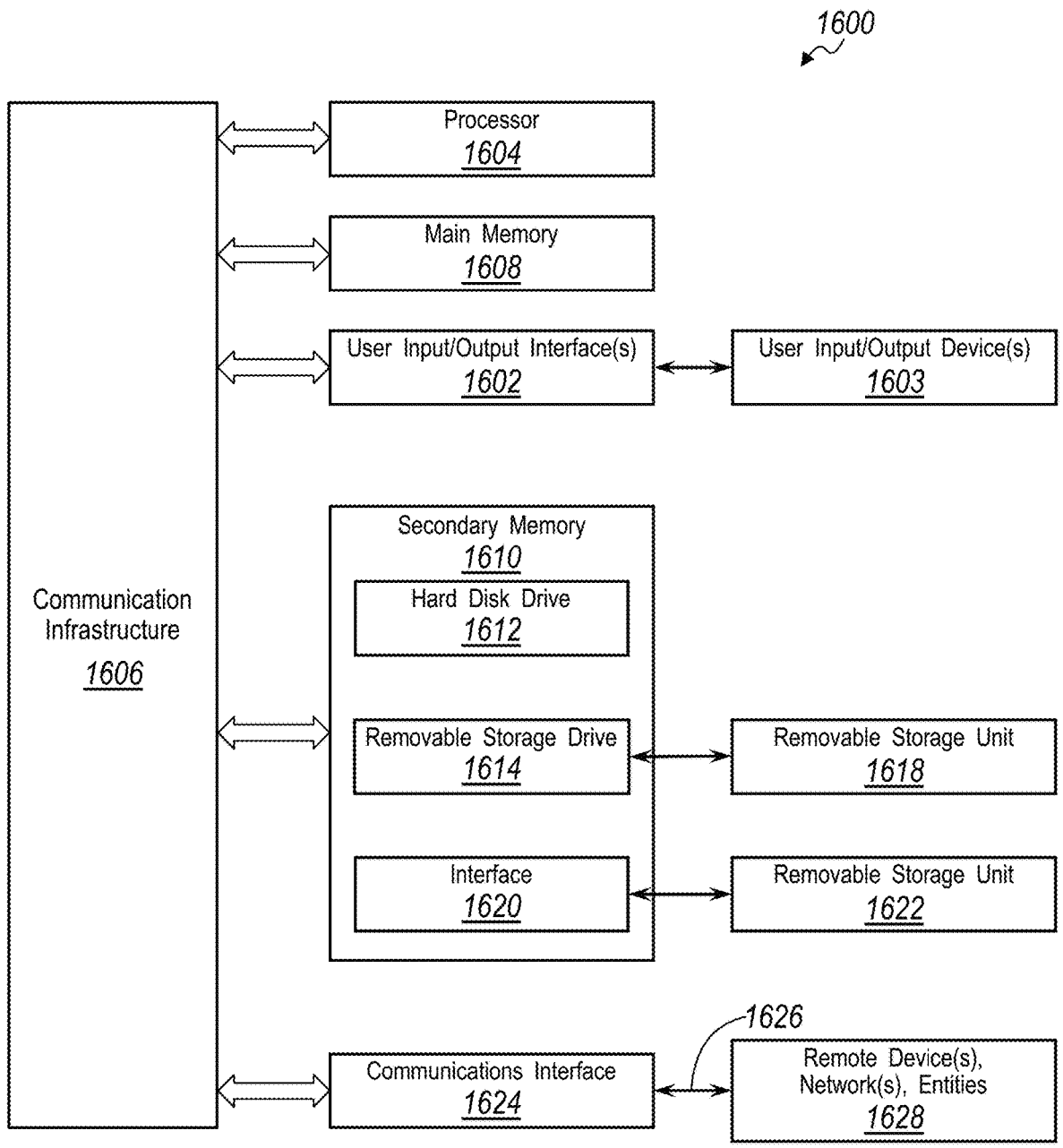
FIG. 16 is a detailed schematic diagram of an example computer system for implementing various embodiments, in accordance with aspects of the disclosure.

The sensor system 100 may be implemented in an AV system 200, which includes one or more controllers, such as computer system 1600 shown in FIG. 16. The computer system 1600 may be any computer capable of performing the functions described herein. The computer system 1600 also includes user input/output interface(s) 1602 and user input/output device(s) 1603, such as buttons, monitors, keyboards, pointing devices, etc.

The computer system 1600 includes one or more processors (also called central processing units, or CPUs), such as a processor 1604. The processor 1604 is connected to a communication infrastructure or bus 1606. The processor 1604 may be a graphics processing unit (GPU), e.g., a specialized electronic circuit designed to process mathematically intensive applications, with a parallel structure for parallel processing large blocks of data, such as mathematically intensive data common to computer graphics applications, images, videos, etc.

The computer system 1600 also includes a main memory 1608, such as random-access memory (RAM), that includes one or more levels of cache and stored control logic (i.e., computer software) and/or data. The computer system 1600 may also include one or more secondary storage devices or secondary memory 1610, e.g., a hard disk drive 1612; and/or a removable storage device 1614 that may interact with a removable storage unit 1618. The removable storage device 1614 and the removable storage unit 1618 may be a floppy disk drive, a magnetic tape drive, a compact disk drive, an optical storage device, tape backup device, and/or any other storage device/drive.

The secondary memory 1610 may include other means, instrumentalities or other approaches for allowing computer programs and/or other instructions and/or data to be accessed by computer system 1600, e.g., an interface 1620 and a removable storage unit 1622, e.g., a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 1600 may further include a network or communication interface 1624 to communicate and interact with any combination of remote devices, remote networks, remote entities, etc. (individually and collectively referenced by reference number 1628). For example, the communication interface 1624 may allow the computer system 1600 to communicate with remote devices 1628 over a communication path 1626, which may be wired and/or wireless, and which may include any combination of LANs, WANs, the Internet, etc. The control logic and/or data may be transmitted to and from computer system 1600 via communication path 1626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, the computer system 1600, the main memory 1608, the secondary memory 1610, and the removable storage units 1618 and 1622, as well as tangible articles of manufacture embodying any combination of the foregoing. Such control logic, when executed by one or more data processing devices (such as the computer system 1600), causes such data processing devices to operate as described herein.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Based on the teachings contained in this disclosure, it will be apparent to persons skilled in the relevant art(s) how to make and use embodiments of this disclosure using data processing devices, computer systems and/or computer architectures other than that shown in FIG. 16. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other. The breadth and scope of this disclosure should not be limited by any of the above-described exemplary embodiments, but should be defined only in accordance with the following claims and their equivalents.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. An autonomous vehicle (AV) system comprising:
 a sensor configured to:
   receive light reflected off of at least one object within a field of view (FOV) adjacent to a vehicle as reflected light, and
   provide tire data indicative of a distance between the sensor and a surface of a tire of the vehicle extending into the FOV based on the reflected light; and
 a controller configured to:
   generate a message in response to a moment of a probability distribution of the tire data being less than a threshold, or tire data indicative of a rate of change of shadow length exceeding a threshold shadow length, and
   provide the message to at least one of a user interface, a vehicle system, and an external computing device.

2. The AV system of claim 1, wherein the moment of the probability distribution of the tire data comprises one of a standard deviation, a variance, a skew, and a kurtosis of the tire data.

3. The AV system of claim 1, wherein the sensor is further configured to:
 provide object data indicative of a distance between the sensor and an object external to the vehicle based on the reflected light; and
 wherein the controller is further configured to control at least one of a propulsion system, a steering system, and a braking system based on the object data.

4. The AV system of claim 1, wherein the sensor comprises a lidar sensor, and wherein the moment of the probability distribution is indicative of a difference between a first distance, between the lidar sensor and at least one tread segment of the surface of the tire, and a second distance between the lidar sensor and at least one groove of the surface of the tire, over a series of sequential sweeps across the surface of the tire.

5. The AV system of claim 1, wherein the sensor comprises a lidar sensor, and wherein the surface of the tire comprises an inner region, a central region, and an outer region collectively extending across a width of the tire.

6. The AV system of claim 5, wherein the controller is further configured to generate a signal indicative of a wear message in response to the moment of the probability distribution of the tire data being less than the threshold within the inner region, the central region, and the outer region of the surface.

7. The AV system of claim 5, wherein the controller is further configured to generate a signal indicative of a misalignment message in response to the moment of the probability distribution of the tire data being less than the threshold within the inner region or the outer region of the surface.

8. The AV system of claim 5, wherein the controller is further configured to:
 generate a signal indicative of an overinflation message in response to the moment of the probability distribution of the tire data being less than the threshold within the central region of the surface; and
 generate a signal indicative of an underinflation message in response to the moment of the probability distribution of the tire data being less than the threshold within both the inner region and the outer region of the surface.

9. The AV system of claim 1, wherein the sensor comprises a camera, and wherein the camera is further configured to:
 receive first light reflected off the surface of the tire arranged at a first steering angle;
 receive second light reflected off of the surface of the tire arranged at a second steering angle that is different from the first steering angle; and
 wherein the controller is further configured to:
   determine a first shadow length of the tire based on the first light,
   determine a second shadow length of the tire based on the second light,
   generate a signal indicative of a tire wear message in response to a difference between the first shadow length and the second shadow length exceeding the threshold shadow length, and
   provide the tire wear message to at least one of the user interface, the vehicle system, and the external computing device.

10. The AV system of claim 9, further comprising:
 a lidar sensor to provide object data indicative of a distance between the lidar sensor and an object external to the vehicle; and
 a light source configured to project light to reflect off of the tire as the first light and the second light.

11. The AV system of claim 10, wherein the controller is further configured to:
 control at least one of a propulsion system, a steering system, and a braking system to locate the tire at a predetermined location relative to the light source based on the object data.

12. A method for monitoring tire conditions comprising:
 receiving, by a sensor, light reflected off of at least one object within a field of view (FOV) adjacent to a vehicle as reflected light;
 providing tire data indicative of a distance between the sensor and a surface of a tire of the vehicle extending into the FOV based on the reflected light;
 generating a first tire message in response to a moment of a probability distribution of the tire data being less than a threshold;
 generating a second tire message in response to tire data indicative of a rate of change of shadow length exceeding a threshold shadow length; and
 providing the first tire message or the second tire message to at least one of a user interface, a vehicle system, and an external computing device.

13. The method of claim 12 further comprising:
 providing external object data indicative of a distance between the sensor and an object external to the vehicle based on reflected light from the object external to the vehicle; and controlling at least one of a propulsion system, a steering system, and a braking system based on the external object data.

14. The method of claim 12, wherein the sensor is a lidar sensor, the method further comprising:
generating a signal indicative of a wear message in response to the moment of the probability distribution of the tire data being less than the threshold within an inner region, a central region, and an outer region of the surface of the tire.

15. The method of claim 12, wherein the sensor is a lidar sensor, the method further comprising:
generating a signal indicative of a misalignment message in response to the moment of the probability distribution of the tire data being less than the threshold within an inner region or an outer region of the surface of the tire.

16. The method of claim 12, wherein the sensor is a lidar sensor, the method further comprising:
generating a first signal indicative of an overinflation message in response to the moment of the probability distribution of the tire data being less than the threshold within a central region of the surface; and
generating a second signal indicative of an underinflation message in response to the moment of the probability distribution of the tire data being less than the threshold within both an inner region and an outer region of the surface.

17. The method of claim 12, wherein the sensor is a camera, the method further comprising:
receiving first light reflected off the surface of the tire arranged at a first steering angle and to receive second light reflected off of the surface of the tire arranged at a second steering angle that is different from the first steering angle;
determining a first shadow length of the tire based on the first light;
determining a second shadow length of the tire based on the second light;
generating a signal indicative of a tire wear message in response to a difference between the first shadow length and the second shadow length, indicative of a rate of change, exceeding the threshold shadow length; and
providing the tire wear message to at least one of the user interface, the vehicle system, and the external computing device.

18. The method of claim 17 further comprising:
controlling the tire to rotate between the first steering angle and the second steering angle at a predetermined adjustment rate; and
controlling the camera to take pictures at a predetermined rate, the pictures including the first light and the second light.

19. A non-transitory computer-readable medium having instructions stored thereon that, when executed by at least one computing device, cause the at least one computing device to perform operations comprising:
providing tire data indicative of a distance between a sensor and a surface of a tire of a vehicle extending into a field of view (FOV) adjacent to the vehicle;
generating a message in response to a moment of a probability distribution of the tire data being less than a threshold, or a difference between a first shadow length and a second shadow length of the tire data exceeding a threshold shadow length; and
providing the message to at least one of a user interface, a vehicle system, and an external computing device.

20. The non-transitory computer-readable medium of claim 19, wherein the operations further comprise:
generating a first signal indicative of a wear message in response to the moment of the probability distribution of the tire data being less than the threshold within an inner region, a central region, and an outer region of the surface of the tire;
generating a second signal indicative of a misalignment message in response to the moment of the probability distribution of the tire data being less than the threshold within the inner region or the outer region of the surface;
generating a third signal indicative of an overinflation message in response to the moment of the probability distribution of the tire data being less than the threshold within the central region of the surface; and
generating a fourth signal indicative of an underinflation message in response to the moment of the probability distribution of the tire data being less than the threshold within both the inner region and the outer region of the surface.

* * * * *